United States Patent [19]

Yamanaka et al.

[11] Patent Number: 5,061,562

[45] Date of Patent: Oct. 29, 1991

[54] METHOD FOR PREPARING A MAGNETIC RECORDING MEDIUM AND A MAGNETIC DISK USING THE SAME

[75] Inventors: Fusao Yamanaka; Makoto Nagao; Yasuyuki Yamada; Kazuhiko Morita, all of Kanagawa, Japan

[73] Assignee: Fuji Photo Film Co., Ltd., Kanagawa, Japan

[21] Appl. No.: 246,829

[22] Filed: Sep. 20, 1988

[30] Foreign Application Priority Data

Sep. 22, 1987 [JP] Japan .................................. 62-236083
Sep. 22, 1987 [JP] Japan .................................. 62-238005

[51] Int. Cl.$^5$ ............................................. G11B 23/00
[52] U.S. Cl. ..................................... 428/408; 427/50; 427/130; 427/132; 428/694; 428/695; 428/900
[58] Field of Search .............. 428/408, 694, 695, 900; 427/129, 130, 131, 132, 48, 50; 206/444; 360/133

[56] References Cited

U.S. PATENT DOCUMENTS

| | | | |
|---|---|---|---|
| 4,251,843 | 2/1981 | Mosuyama et al. | 360/133 |
| 4,647,507 | 3/1987 | Suzuki et al. | 428/900 |
| 4,696,845 | 9/1987 | Yanagisawa et al. | 428/900 |
| 4,709,816 | 12/1987 | Matsumoto et al. | 428/695 |
| 4,746,559 | 5/1988 | Nishikawa et al. | 427/131 |
| 4,840,843 | 6/1989 | Sano et al. | 428/695 |
| 4,880,687 | 11/1989 | Yokoyama et al. | 427/132 |

Primary Examiner—Paul J. Thibodeau
Attorney, Agent, or Firm—Sughrue, Mion, Zinn, Macpeak & Seas

[57] ABSTRACT

A method for preparing a magnetic recording medium which comprises the steps:

(a) providing on a non-magnetic support, a thin magnetic metal film, (b) providing on the thin magnetic film, a protective layer comprised substantially of carbon, (c) washing the surface of the protective layer at least once, each washing performed with one substance selected from the group consisting of an alkali detergent, a neutral detergent and an organic solvent, and (d) providing on the surface of the protective layer, a lubricating layer containing at least one organic lubricating agent.

Where the magnetic recording mediums produced therefrom exhibit excellent lubricating properties and running durability and causes no attachments on a magnetic head. Magnetic disks produced from the magnetic recording mediums also exhibit excellent lubricating properties and running durability and also do not cause attachments on a magnetic head.

20 Claims, 1 Drawing Sheet

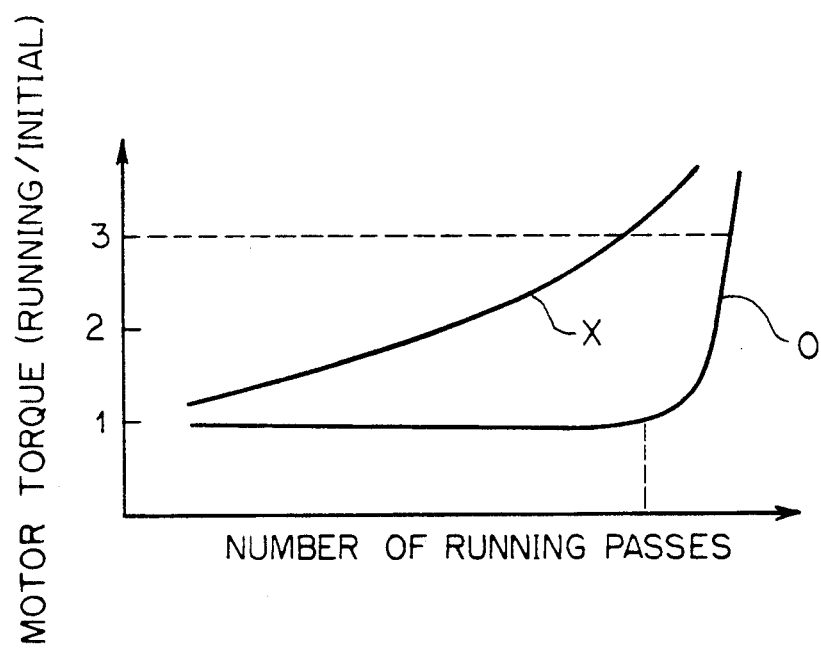

METHOD FOR PREPARING A MAGNETIC RECORDING MEDIUM AND A MAGNETIC DISK USING THE SAME

FIELD OF THE INVENTION

This invention relates to a thin metal film type magnetic recording medium for use in a disk. More particularly, it relates to a thin metal film type magnetic recording medium used in a magnetic disk having improved running durability.

BACKGROUND OF THE INVENTION

Due to the increased demand for higher recording density of a magnetic recording medium, thin metal film type magnetic recording mediums have drawn much attention a compared to conventional coated type magnetic recording mediums.

However, unlike the conventional coated type recording mediums, it has been difficult to incorporate a lubricating agent and an abrasive agent into a magnetic layer of thin metal film type magnetic recording mediums. Therefore, running durability has been found to be extremely poor. For example, a perpendicular magnetic recording disk having a CO—Cr alloy film can not continue running after 5000 passes or more in many cases, because the alloy layer sticks to the magnetic head.

To solve this problem, it has been proposed to coat a liquid lubricating agent on a surface of a magnetic layer, or alternatively to provide a solid protective layer on a surface of a magnetic layer. In the latter instance, in order to remove stains present on the surface of a thin metal film and to improve the adhesiveness of a protective layer to a thin metal film, it has been proposed to first wash the surface of a thin metal film with an alkaline solution, as disclosed in JP-A-62-42331. (The term "JP-A" as used herein means an "unexamined published Japanese patent application".)

It is known that providing a protective layer mainly composed of carbon, which is solid lubricating agent, on a surface of a magnetic layer is particularly effective in improving running durability, as disclosed in JP-B-54-33521. (The term "JP-B" as used herein means an "examined Japanese patent publication".)

However, a protective layer having a conventional structure and comprised of conventional materials has proved inadequate in terms of imparting sufficiently high durability, wear resistance, weather resistance and corrosive resistance to the magnetic recording medium. Also, a head sticks to the surface of the medium, which is the so-called "adsorption" phenomenon.

In this connection, it has been proposed to provide a top coat layer containing a mono- or polyether having a perfluoroalkyl group, a carboxylic acid derivative thereof or a phosphoric acid derivative thereof as a lubricating agent on a surface of such a protective layer, as disclosed in JP-A-62-150525.

Still, running durability has been found to be insufficient even if a top coat layer is provided on a protective layer mainly composed of carbon because the top coat layer provides insufficient lubrication and attachments present on a head increase the friction coefficient of the protective layer.

Moreover, although running durability is slightly improved by alkaline washing the surface of a thin metal film, such treatment is insufficient to provide a high density recording medium with high durability. Further, as the number of running passes increases, the motor torque undesirably increases.

SUMMARY OF THE INVENTION

A first object of this invention is to provide a method for preparing a thin metal film type magnetic recording medium causing no attachments on a head and having excellent lubricating properties and running durability.

A second object of this invention is to provide a thin metal film type magnetic disk causing no attachments on a head, having excellent lubricating properties even after long storage at a high temperature and a high humidity, and excellent running durability.

These objects have been achieved by a method for preparing a magnetic recording medium which comprises the steps of (a) providing on a non-magnetic support, a thin magnetic metal film, (b) providing on the thin magnetic film, a protective layer comprised substantially of carbon, (c) washing the surface of the protective layer at least once, each washing performed with one substance selected from the group consisting of an alkali detergent, a neutral detergent and an organic solvent, and then (d) providing on the surface of the protective layer, a lubricating layer containing at least one organic lubricating agent; and by a magnetic disk comprising the above prepared magnetic medium and a liner impregnated with an organic lubricating agent.

BRIEF EXPLANATION OF THE DRAWINGS

The Figure is a graph showing the relationship of the number of running passes (%) with motor torque in FD drive of a magnetic recording medium of this invention.

DETAILED DESCRIPTION OF THE INVENTION

In this invention, the protective layer is comprised substantially of a diamond-like film, graphite or amorphous carbon. Graphite is the preferred material.

The protective layer can be prepared by vacuum evaporation, sputtering, etc. and is in the form of an amorphous film. It is amorphous in view of that a clear peak can not be seen by X ray diffractiometry, and which is found to be a graphite film in light of plasmon loss energy of carbon by X-ray photoelectron spectroscopy (XPS).

It is desirable that the protective layer additionally comprises a metal such as Cr, Mn, Mo, Nb, Ta, Ti, V or W alone or in combination in a total amount of 10 wt % or lower, preferably from 0.5 to 5 wt % to the weight of carbon in the protective layer.

An alkaline detergent, a neutral detergent, an organic solvent is used to wash the protective layer.

The alkaline detergent which can be used in this invention is a salt composed of a weak acid and a strong base and is exhibits alkalinity (i.e., pH greater than 7) in water. Such a detergent is represented by alkali metal salts of aliphatic acids preferably having 6 to 22 carbon atoms, such as caproic acid and behenic acid. Commercially available alkaline detergents include amphoteric surface active agents such as "Scat 20-X" manufactured by DAI-ICHI KOGYO SEIYAKU CO., LTD., and "SONOCLAIN 277" manufactured by Kaijo Denki Co, Ltd., with "SONOCLAIN 277" being preferred. These products are mixtures of inorganic salts (e.g., sodium silicate and potassium phosphate), anionic surfactants (e.g., toluenesulfonates), nonionic surfactants (e.g., aliphatic acid esters) and chelating agents (e.g., ethylenediaminetetraacetic acid salts).

Examples of neutral detergent include anionic surfactants and nonionic surfactants, which are neutral when dissolved in water, such as sodium alkylsulfonate and sodium alkylarylsulfonate (the alkyl moiety of these compounds preferably having 6 to 24 carbon atoms)

Suitable organic solvents are those having a specific gravity of 0.8 to 1.6 (measured at 4 to 20° C.) and a boiling point of 30 to 200° C., such as n-hexane, methyl ethyl, keton, benzene, chlorobenzene, acetone, ether and chlorofluorocarbon solvents such as DAIFLON (manufactured by Daiki Industries, Ltd.), FRON 11, (trichloromonofluoroethane) FRON 112, (1,1,2,2-tetrachloro-1,2-difluoroethane) FRON 113, (1,1,2-trichloro-1,2,2-trifluoroethane) with FRON 113 (e.g., "FRONSOLVE" or "FRONSOLVE AD-9" manufactured by Asahi Glass Co., Ltd.) being preferred.

Washing is done by soaking a magnetic recording medium in a solution of one of the above-described detergents, generally at the concentration of from 0.1 to 6 wt %, preferably about 2 wt %) or in the organic solvents, generally for 1 to 6 minutes (preferably about 2 minutes) at a temperature of 25° to 30° C., or by coating a solution of one of the above-described detergents or the organic solvents on a protective layer of the medium, for example, using a spin coater at 200 to 600 rpm at a temperature of 25° to 30° C., followed by drying at 2000 to 6000 rpm. Alternatively, one of the above detergents or solvents may be sprayed on the protective layer. Washing by soaking is preferred, and in this instance, washing effects can be improved if ultrasonic wave (oscillation condition: 400 W and 28 kHz) are used.

After the protective layer is washed, it is dried and a lubricating layer containing at least one organic lubricating agent is coated thereon. Suitable organic lubricating agents include fluorine type lubricating agents, phosphate compounds, organic compounds containing a mercapto group and other known organic lubricating agents; the former three agents being preferred.

The preferred fluorine type lubricating agents for use in this invention include compounds having a perfluoroalkyl or perfluoroalkenyl group preferably of 6 to 12 carbon atoms, perfluoroalkylene oxide polymers preferably having the alkylene moiety of 2 or 3 carbon atoms and having a molecular weight of 1000 to 10000 and derivatives thereof, and polymers and copolymers of ethylene containing at least one fluorine substituent, preferably having a molecular weight of 1000 to 5000.

Specific examples of compounds having a perfluoroalkyl group or a perfluoroalkenyl group include carboxylic acids preferably having 6 to 12 carbon atoms such as perfluorohexanoic acid, perfluorooctanoic acid, perfluorodecanoic acid, perfluorononenic acid and perfluorohexenoic acid; esters of carboxylic acids preferably having 6 to 10 carbon atoms, such as stearyl perfluorooctanate, stearyl perfluorononeate and stearyl perfluorooctonate; and mercaptans, nonionic surface active agents, cationic surface active agents, anionic surface active agents or amphoteric surface active agents which have a perfluoroalkyl group or a perfluoroalkenyl group.

Specific examples of perfluoroalkylene oxide polymers and derivatives thereof include perfluoropropylene polymers, perfluoroethylene-perfluoromethylene copolymers perfluoropropylene-perfluoromethylene copolymers, and those having a polar group (e.g., —COOH, —OP$_3$Na$_2$, —OSO$_2$Na, —SO$_2$NH$_4$, —OH, and —SO$_3$Na) at the terminus of the molecule.

Specific examples of polymers or copolymers of ethylene substituted with fluorine include polytetrafluoroethylene, polytrifluoroethylene, poly-1,1-difluoroethylene(polyvinylidene fluoride) and trifluoroethylene-1,1-difluoroethylene copolymer.

The phosphate compounds for use in this invention preferably contain an aryl group or an alkyl group having 10 or more carbon atoms, more preferably a saturated aliphatic group having 12 or more carbon atoms, and can be a monoester, diester or triester.

Examples of phosphate compounds include aliphatic esters such as tri-n-octadecyl phosphate (tri-stearyl phosphate), trihexadecyl phosphate, tridodecyl phosphate, trioctyl phosphate, tri-n-butyl phosphate, trioleyl phosphate, di-n-octadecyl phosphate, didodecyl phosphate, diisopropyl phosphate, dioleyl phosphate and dihexadecyl phosphate, and aromatic phosphates such as triphenyl phosphate, tricresyl phosphate, diphenyl phosphate and dicresyl phosphate. Among these, tri-n-octadecyl phosphate (tristearyl phosphate), trihexadecyl phosphate, tridodecyl phosphate, trioleyl phosphate, di-n-octadecyl phosphate, didodecyl phosphate, dioleyl phosphate and dihexadecyl phosphate are preferred. Tri-n-octadecyl phosphate (tristearyl phosphate) is particularly preferred.

Examples of organic compounds containing a mercapto group include alkylmercaptans such as tetradecylmercaptan, hexadecylmercaptan and octadecylmercaptan; mercapto group-substituted heterocyclic compounds such as mercaptobenzimidazole derivatives and thiobartituric acid derivatives; and organic compounds containing both a mercapto group and an ester bond in a molecule, which are preferred among these.

Examples of compounds containing both a mercapto group and an ester bond in a molecule include monoester or diester compounds such as behenyl β-mercaptopropionate, octadecyl β-mercaptopropionate, dodecyl β-mercaptopropionate, octyl β-mercaptopropionate, methyl β-mercaptopropionate, oleyl β-mercaptopropionate, behenyl thioglycolate, octadecyl thioglycolate, dodecyl thioglycolate, octyl thioglycolate, methyl thioglycolate, oleyl thioglycolate, behenyl thiosalicylate, octadecyl thiosalicylate, dodecyl thiosalicylate, octyl thiosalicylate, methyl thiosalicylate, olelyl thiosalicylate, 2-mercaptoethyl stearate, 2-mercaptoethyl oleate, 2-mercaptoethyl myristate, 2-mercaptoethyl laurate, di-2-mercaptoethyl maleate, 2-mercaptoethyl propionate, dioctadecyl thiomaliate, and dihexadecyl thiomaliate, as well as oligoesters and polyester compounds having a mercapto group.

Two or more of fluorine type lubricating agents, phosphate compounds and mercapto group-containing organic compounds may be used as a mixture in this invention.

A commonly used lubricating agent may be added to the lubricating layer composition in addition to the above-described lubricating agents. The mixing weight ratio of such lubricating agents to the lubricating agents of the present invention (i.e., the fluorine type lubricating agents, the phosphate compounds and/or the mercapto group-containing organic compounds) is preferably from 0 to 1/1 and more preferably from 0 to ½.

The lubricating agents which can be used in combination with fluorine type lubricating agents, phosphate compounds and/or mercapto group-containing organic compounds include fatty acids, metal soaps, fatty acid amines, fatty acid esters, higher aliphatic alcohols, monoalkyl phosphates, dialkyl phosphates, trialkyl phosphates, paraffins, silicone oils, animal and vegetable oils, mineral oils, higher aliphatic amines; inorganic particles such as graphite, silica, molybdenum disulfide and tungsten disulfide; resin particles such as polyethylene, polypropylene, polyvinyl chloride, copolymers of ethylene and vinyl chloride, and polytetrafluoroethylene; α-olefin polymers; and unsaturated aliphatic hydrocarbons which are liquid at room temperature.

The lubricating layer is formed, for example, by a method which comprises dissolving the above-described lubricating agent in an organic solvent, coating or spraying the resultant solution on the protective layer and drying it; a method which comprises melting the lubricating agent and coating it on the protective layer; a method which comprises dissolving the lubricating agent in an organic solvent and dipping the protective layer-carried recording medium in the resulting solution to adsorb the lubricating agent, and a method which comprises forming a single molecular film on the surface of the protective layer-carried recording medium by the Langmuir-Blodgett method as disclosed in J. Myeslers et al., *Clean surface: Their preparation and characterization for interfacial studies*, G. Goldfinger ed., Marcel Dekker, New York (1970), and J. H. Fendler, *Membrane mimetic chemistry*, Wiley Interscience, 81 (1982).

A thin metal film type magnetic layer is comprised of a ferromagnetic metal such as Fe, Co, Ni, or a ferromagnetic alloy such as Fe—Co, Fe—Ni, Co—Ni, Fe—Si, Co—Cr, Co—V, Co—Sm, Co—Pt, Co—P, Co—Ni—P, or Fe—Cr—Co, those added with additives or multi-layers made therefrom.

Examples of non-mangetic supports include film-shape high molecular weight materials such as polyethylene terephthalate, polyimide and polyamide, disk-shape high molecular weight materials such as polycarbonate and polymethyl methacrylate, ceramics such as glass, and metals such as aluminum. The support may be in the shape of a sheet, a card, a disk, a drum and a tape.

A method for preparing a magnetic recording medium of this invention comprises first, forming a metallic magnetic layer by vacuum evaporation, sputtering, ion plating or via a metal plating method; second, forming thereon a protective layer comprised substantially of carbon which optionally contains at least one of Cr, Mn, Mo, Nb, Ta, Ti, V and W by vacuum evaporation or sputtering; third, washing the protective layer with an alkaline detergent, a neutral detergent or an organic solvent; and fourth, coating on the protective layer a lubricating layer containing at least one of a fluoride type lubricating agent, a phosphate and an organic compound containing a mercapto group.

In this case, a metallic magnetic layer can be a laminated layer having two different kinds of magnetic particles, a single layer having an underlayer or a laminated layer having an intermediate layer, as described in *Summary of Science Lectures in the 9th Japan Applied Magnetic Society*, P. 5 (Nov. 1985) and *Journal of Japan Applied Magnetic Society*, Vol. 11, No.2, p. 87 and p. 125 (1987). The magnetic layer has a thickness generally of from 0.1 to 2 μm.

When a protective layer and a lubricating layer are too thick, electromagnetic characteristics are deteriorated due to the spacing loss between a head and the medium. Conversely, when these layers are too thin, running durability can not be improved. Therefore, the protective layer should have a thickness generally of from 10 to 1000Å, preferably from 50 to 200Å, and the lubricating layer should have a thickness (in terms of the total amount of lubricating agent to be present) generally from 0.5 to 100 mg/m$^2$, more preferably from 2 to 20 mg/m$^2$.

The thus obtained magnetic recording medium exhibits excellent lubricating properties and can be used as an audio tape, a video tape, magnetic disk and the like.

A magnetic disk comprises a case encasing a magnetic recording sheet and a liner which is provided between the case and the magnetic recording sheet to clean the surface of the recording sheet and also to prevent wear of the recording sheet. The liner is generally non-woven cloth of rayon, polyethylene terephthalate fiber, nylon, polypropylene fiber, or the like. When the medium of this invention is used as a magnetic recording sheet in the disk, it is preferable that the liner which encases the medium is also impregnated with the organic lubricating agent whereby the organic lubricating layer on the surface of the medium is prevented from drying even after long storage at a high temperature and a high humidity, thus providing the magnetic disk with excellent lubricating properties and running durability.

Upon impregnating the liner with an organic lubricating agent the organic lubricating agent must be in a liquid solution such as when the agent is dissolved in an organic solvent. The organic lubricating agent used for the liner can be the same as that used for the surface of the protective layer.

The method used for impregnating the liner with the organic lubricating agent can be the same as that for forming a lubricating layer as described above.

It is preferred to use the magnetic medium of this invention such that the liner is kept not in contact with the surface of the medium without providing a lifter with a jacket. Thus, the lubricating agent impregnated in the liner can be supplied on the surface of the magnetic medium only upon running by such a manner that a part of the magnetic disk is pinched by a protrusion(s) provided in a drive to bring the liner in contact with the magnetic medium when the magnetic disk is inserted on the drive.

This invention will be illustrated in more detail by the following Examples, but should not be limited thereto. Unless otherwise specified, all parts, percents, ratios etc. are by weight.

EXAMPLE 1

Samples 1 to 36 were prepared as follows:

A polyimide film having a thickness of 50 μm was used as a non-magnetic support.

A Co—Cr or Co—Ni thin film having a thickness of 25000Å was formed on the support by sputtering Co—Cr or Co—Ni in an atmosphere of Ar gas.

A protective layer having a thickness of 200Å and comprised substantially of graphite-like carbon and further comprising at least one of Cr, Mn, Mo, Nb, Ta, Ti, V and W in various amounts as shown in Table 1 was formed on the above-described Co—Cr or Co—Ni thin film by sputtering pellets comprised of at least one of Cr, Mn, Mo, Nb, Ta, Ti, V and W onto the graphite target in an atmosphere of Ar gas.

The resulting medium was successively immersed in two baths which contained sodium alkylsulfonate, and one of DAIFRON, methyl ethyl ketone and n-hexane, respectively, and was then washed with ultrasonic wave washing for 2 minutes in each bath.

The following various lubricating agents (a) to (e) to form five different lubricating solutions were dissolved in methyl ethyl ketone and were variously coated onto the protective layer as shown in Table 1 and dried to form a lubricating layer having a thickness of 15 mg/m$^2$.

Lubricating agents (a) Perfluoropolyether ("AM2001", manufactured by Montefluos Co., Ltd.)
(b) Perfluorononylalcohol
(c) Perfluorooctylethylene oxide adduct (average number of ethyleneoxide units =7)
(d) Perfluoroethylene-perfluoromethylene co-polymer ("Fonbrin Z4000" manufactured by Montefluors Co., Ltd.)
(e) Octadecyl perfluorooctanate The thus obtained medium was cut in the shape of a disk having a diameter of 3.5 inches and was enclosed in a commercially available MF 2HD jacket manufactured by Fugi Photo Film Co., Ltd. to prepare a sample. Samples provided with no carbon containing protective layer (Samples 5 and 6), samples prepared without a washing step (Samples 2, 4, 6, 8 and 10) and samples prepared without using a lubricating agent (Samples 7 to 10) were also prepared.

After recording signals using a commercially available floppy disk drive (slider material: calcium titanium, both sides slider type), a running durability test was conducted for all samples by counting the number of passes until the friction coefficient abruptly increased, while reproduced signals and the friction coefficient were monitored at a rotating rate of 300 r.p.m., at 25±2° C., and 30±5% RH. At the same time, whether or not a protective layer was stripped off and the state of attachments on a head were observed with an optical microscope.

The amounts of Cr, Mn, Mo, Nb, Ta, Ti, V and W were determined by a peak ratio of differential spectrum of each element to carbon measured by Auger electron spectrography. Similar to the above, it was confirmed that the composition of elements of the protective layer in the thickness direction did not change.

Kinds and amounts of additives added to the protective layer and the kinds of lubricating agents and the results are shown in Table 1. It is clear from the results in Table 1 that the samples having a protective layer comprised substantially of graphite-like carbon and after washing provided thereon with a lubricating layer containing fluoride type lubricating agent (Samples 1, 3, and 11 to 36) exhibits excellent running durability as compared to the samples having either no lubricating layer (Samples 7 to 10) or prepared without washing the surface of the protective layer before forming a lubricating layer thereon (Samples 2, 4, 6, 8 and 10). As a result of the microscopic observation of a head and a film surface, it was confirmed that the samples having excellent running durability also were free from attachments and scratches. The samples having at least one of Cr, Mn, Mo, Nb, Ta, Ti, V and W contained in the protective layer in a suitable amount exhibited especially superior running durability.

Attachments on a head were observed by an optical microscope(×20). The mark "A" means there are hardly any attachments and the mark "B" means there are some. The mark "C" means there are a lot of attachments.

Scratches on the film surface were observed by an optical microscope (×160). The mark "A" means there are hardly any scratches and the mark "B" means there are some.

At the time when the magnetic recording medium made 90% or more passes until it stopped, the ratio of motor torque (motor torque while the medium is running/motor toque at an initial stage of running) was evaluated. The case when the ratio of motor torque ≦ 1.1 was identified as "A", and the case when the ratio thereof ≧ 1.1 was identified as "B". (FIG. 1).

In the conclusive evaluation columns, "C" means that the medium does not reach a practical level, "B" means that the medium nearly reaches a practical level, and "A" means that the medium reaches a practical level.

TABLE 1

| Sample No. | Metal thin film layer (kind) | Protective layer (kind) | Protective layer Metals (kinds) | Protective layer Metals Amount (wt %) | (fluoride type lubricating agent) Absence (X) or presence (○) of washing step | Lubricant layer (kinds) | Attachments on a head | Scratches on a film | Number of passes of running durability (× 10$^4$ passes) | With (X) or without (○) increase of torque | Evaluation |
|---|---|---|---|---|---|---|---|---|---|---|---|
| 1 | Co—Cr | Carbon | V | 5.3 | ○ (DAIFRON) | (a) | A | A | 1900 | ○ | A |
| 2 | " | " | " | " | X | " | A | A | 690 | X | B |
| 3 | " | " | — | — | ○ (DAIFRON) | " | A | A | 1800 | ○ | A |
| 4 | " | " | — | — | X | " | A | A | 100 | X | C |
| 5 | " | — | — | — | ○ (DAIFRON) | " | C | B | 3 | X | C |
| 6 | " | — | — | — | X | " | C | B | 2 | X | C |
| 7 | " | Carbon | V | 5.0 | ○ (DAIFRON) | — | B | B | 840 | X | B |
| 8 | " | " | " | " | X | — | B | B | 870 | X | B |
| 9 | " | " | — | — | ○ (DAIFRON) | — | B | B | 20 | X | C |
| 10 | " | " | — | — | X | — | B | B | 25 | X | C |
| 11 | " | " | — | — | ○ (DAIFRON) | (a) | A | A | 1800 | ○ | A |
| 12 | " | " | — | — | ○ (DAIFRON) | (b) | A | A | 1820 | ○ | A |
| 13 | " | " | — | — | ○ (DAIFRON) | (c) | A | A | 1790 | ○ | A |
| 14 | " | " | — | — | ○ | (d) | A | A | 1830 | ○ | A |

TABLE 1-continued

| Sample No. | Metal thin film layer (kind) | Protective layer Protective layer (kind) | Metals (kinds) | Metals Amount (wt %) | Absence (X) or presence (○) of washing step | (fluoride type lubricating agent) Lubricant layer (kinds) | Attachments on a head | Scratches on a film | Number of passes of running durability (× 10⁴ passes) | With (X) or without (○) increase of torque | Evaluation |
|---|---|---|---|---|---|---|---|---|---|---|---|
| 15 | Co—Cr | Carbon | — | — | ○ (DAIFRON) | (e) | A | A | 1805 | ○ | A |
| 16 | Co—Ni | " | — | — | ○ (DAIFRON) | (a) | A | A | 1810 | ○ | A |
| 17 | CO—Cr | " | — | — | ○(MEK) | " | A | A | 810 | ○ | A |
| 18 | " | " | — | — | ○(n-Hexane) | " | A | A | 820 | ○ | A |
| 19 | " | " | V | 5.3 | ○ (DAIFRON) | " | A | A | 1950 | ○ | A |
| 20 | " | " | Cr | " | ○ (DAIFRON) | " | A | A | 1850 | ○ | A |
| 21 | " | " | Mn | " | ○ (DAIFRON) | " | A | A | 1960 | ○ | A |
| 22 | " | " | Mo | " | ○ (DAIFRON) | " | A | A | 1860 | ○ | A |
| 23 | " | " | Nb | " | ○ (DAIFRON) | " | A | A | 1970 | ○ | A |
| 24 | " | " | Ta | " | ○ (DAIFRON) | " | A | A | 1990 | ○ | A |
| 25 | " | " | W | " | ○ (DAIFRON) | " | A | A | 1980 | ○ | A |
| 26 | " | " | — | — | ○ (DAIFRON) | " | A | A | 1800 | ○ | A |
| 27 | " | " | V | 0.5 | ○ (DAIFRON) | " | A | A | 1900 | ○ | A |
| 28 | " | " | " | 2.4 | ○ (DAIFRON) | " | A | A | 1920 | ○ | A |
| 29 | Co—Cr | Carbon | V | 3.2 | ○ (DAIFRON) | (a) | A | A | 1950 | ○ | A |
| 30 | " | " | " | 5.1 | ○ (DAIFRON) | " | A | A | 1960 | ○ | A |
| 31 | " | " | " | 9.3 | ○ (DAIFRON) | " | A | A | 1920 | ○ | A |
| 32 | " | " | W | 1.0 | ○ (DAIFRON) | (b) | A | A | 1980 | ○ | A |
| 33 | " | " | " | 2.0 | ○ (DAIFRON) | (c) | A | A | 1940 | ○ | A |
| 34 | " | " | " | 4.0 | ○ (DAIFRON) | (a) | A | A | 1960 | ○ | A |
| 35 | " | " | " | 5.1 | ○ (DAIFRON) | (d) | A | A | 1950 | ○ | A |
| 36 | " | " | " | 9.0 | ○ (DAIFRON) | (e) | A | A | 1930 | ○ | A |

EXAMPLE 2

By following the same procedure as that in Example 1, Samples 37 to 44 were prepared and evaluated except that following lubricating agents (f) and (g) were dissolved in methyl ethyl ketone to form two separate lubricating solutions and the resulting solutions were coated onto the protective layer and dried to form a lubricating layer having a thickness of 15 mg/m².

(f) Tri-n-octadecyl phosphate
(g) Dioleyl phosphate

The kinds and amounts of additives to be added into the protective layer, the kinds and amounts of lubricating agents and the results of evaluation are shown in Table 2.

TABLE 2

| Sample No. | Metal thin film layer (kind) | Protective layer Protective layer (kind) | Metals (kinds) | Metals Amount (wt %) | Absence (X) or presence (○) of washing step | Lubricant layer (kinds) | Attachments on a head | Scratches on a film | Number of passes of running durability (× 10⁴ passes) | With (X) or without (○) increase of torque | Evaluation |
|---|---|---|---|---|---|---|---|---|---|---|---|
| 37 | Co—Cr | Carbon | V | 5.0 | ○ (DAIFRON) | (f) | A | A | 1690 | ○ | A |
| 38 | " | " | Cr | " | ○ (DAIFRON) | " | A | A | 1620 | ○ | A |
| 39 | " | " | Mn | " | ○ (DAIFRON) | " | A | A | 1680 | ○ | A |
| 40 | " | " | Mo | " | ○ (DAIFRON) | " | A | A | 1660 | ○ | A |
| 41 | " | " | V | " | ○ (DAIFRON) | (g) | A | A | 1660 | ○ | A |

TABLE 2-continued

| Sample No. | Metal thin film layer (kind) | Protective layer Protective layer (kind) | Metals (kinds) | Amount (wt %) | Absence (X) or presence (○) of washing step | Lubricant layer (kinds) | Attachments on a head | Scratches on a film | Number of passes of running durability (× 10⁴ passes) | With (X) or without (○) increase of torque | Evaluation |
|---|---|---|---|---|---|---|---|---|---|---|---|
| 42 | " | " | Cr | " | ○ (DAIFRON) | " | A | A | 1600 | ○ | A |
| 43 | " | " | Mn | " | ○ (DAIFRON) | " | A | A | 1670 | ○ | A |
| 44 | " | " | Mo | " | ○ (DAIFRON) | " | A | A | 1640 | ○ | A |

EXAMPLE 3

By following the same procedure as that in Example 1, Samples 45 to 52 were prepared and evaluated except that following lubricating agents (h) and (i) were dissolved in methyl ethyl ketone to form two separate lubricating solutions, which were then coated onto the protective layer and dried to form a lubricating layer having a thickness of 15 mg/m².
(h) Octadecyl thioglycolate
(i) Octadecyl thiosalicylate The kinds and amounts of additives to be added into the protective layer, the kinds and amounts of lubricating agents and the results of evaluation are shown in Table 3.

cially available MF 2HD jucket manufactured by Fuji Photo Film Co., Ltd. to prepare Samples 53 to 80.

Samples prepared without a washing step (Samples 55 and 56) and samples using no lubricating agent in the liner (Samples 54, 56 and 58) also were prepared. Samples 53 to 80 were stored at 60° C. and 90% RH for 2 months, and then a running durability test was done on these samples. At the same time, whether the protective layer was stripped off or not and the state of attachments on a head were observed by an optical microscope. The results thereof are shown in Table 4. The evaluation of attachments on a head, scratches on a film, running durability and torque were made similar to Example 1.

The amounts of Cr, Mn, Mo, Nb, Ta, Ti, V and W

TABLE 3

| Sample No. | Metal thin film layer (kind) | Protective layer Protective layer (kind) | Metals (kinds) | Amount (wt %) | Absence (X) or presence (○) of washing step | Lubricant layer (kinds) | Attachments on a head | Scratches on a film | Number of passes of running durability (× 10⁴ passes) | With (X) or without (○) increase of torque | Evaluation |
|---|---|---|---|---|---|---|---|---|---|---|---|
| 45 | Co—Cr | Carbon | V | 5.0 | ○ (DAIFRON) | (h) | A | A | 1550 | ○ | A |
| 46 | " | " | Cr | " | ○ (DAIFRON) | " | A | A | 1550 | ○ | A |
| 47 | " | " | Mn | " | ○ (DAIFRON) | " | A | A | 1460 | ○ | A |
| 48 | " | " | Mo | " | ○ (DAIFRON) | " | A | A | 1360 | ○ | A |
| 49 | " | " | V | " | ○ (DAIFRON) | (i) | A | A | 1410 | ○ | A |
| 50 | " | " | Cr | " | ○ (DAIFRON) | " | A | A | 1540 | ○ | A |
| 51 | " | " | Mn | " | ○ (DAIFRON) | " | A | A | 1550 | ○ | A |
| 52 | " | " | Mo | " | ○ (DAIFRON) | " | A | A | 1570 | ○ | A |

EXAMPLE 4

By following the same procedure as that in Example 1, a thin metal film and a protective layer were formed on a support. The resulting medium was first dipped and washed in a bath containing alkylbenzene sulfonate and then in a bath containing DAIFRON, wherein ultrasonic wave washing was performed for 2 minutes in each bath.

Each lubricating agent (a) through (f), and (h) was dissolved in methyl ethyl ketone and coated onto the protective layer and dried to form a lubricating layer having a thickness of 15 mg/m².

These media were cut in the shape of a disk having a diameter of 3.5 inches.

The liner was dipped in 0.01 wt % DAIFRON solution of the above lubricating agent for 30 seconds. The above disk and the liner were enclosed in a commerwere determined from the peak ratio of differential spectrum of each element to carbon measured by Auger Electro-spectrography. It was confirmed that the composition of structural elements in the film thickness direction of the protective layer had not changed. Additives and the amounts thereof in the protective layer, the kinds and amounts of lubricating agents and the results of the evaluation are shown in Table 4.

It is clear from the table that the samples provided with a protective layer comprised substantially of graphite-like carbon and containing at least one of Cr, Mn, Mo, Nb, Ta, Ti, V and W in an appropriate amount, and having provided on the protective layer after washing, a lubricating layer containing a fluoride type lubricating agent, encased within a liner impregnated with an organic lubricating agent (Samples 53 and 59 to 80) exhibits excellent running durability as compared to the samples prepared under the same conditions as above except that a liner was not impregnated with an organic lubricating agent (Samples 54, 56 and 58), and the samples prepared under the same conditions as above except that the surface of the protective layer was not washed (Samples 55 and 56).

As a result of observing the head and the film surface by a microscope, it was confirmed that the samples prepared in accordance with the present invention also had no attachments nor scratches.

the head; no scratches as formed on the medium and running durability is greatly improved.

The magnetic disk of this invention exhibits excellent running durability even after a long storage at a high temperature and a high humidity because an organic lubricating agent is supplied from the liner. Further, low torque can be maintained for a long term and therefore, FD drive is not heavily loaded.

While the invention has been described in detail and with reference to specific embodiments thereof, it will

TABLE 4

| Sample No. | Metal thin film layer (kind) | Protective layer Protective layer (kind) | Protective layer Metals (kind) | Protective layer Metals Amount (wt %) | With or without washing step (○: with, X: without) | Lubricating layer (kind) | Liner with or without lubricating agent (○: with, X: without) | Attachments on a head | Scratches on a film | Number of passes of running durability (× 10⁴ passes) | Torque increase | Evaluation |
|---|---|---|---|---|---|---|---|---|---|---|---|---|
| 53 | Co—Cr | Carbon | V | 5.5 | ○ (DAIFRON) | (a) | ○(a) | A | A | 2150 | ○ | A |
| 54 | " | " | " | " | ○ (DAIFRON) | " | X | A | A | 910 | ○ | B |
| 55 | " | " | " | " | X | " | ○(a) | B | A | 570 | X | C |
| 56 | " | " | " | " | X | " | X | B | A | 560 | X | C |
| 57 | " | " | — | — | ○ | " | ○(a) | B | A | 500 | X | C |
| 58 | " | " | — | — | ○ | " | X | B | B | 450 | X | C |
| 59 | " | " | V | 5.0 | ○ (DAIFRON) | " | ○(a) | A | A | 2100 | ○ | A |
| 60 | " | " | " | " | ○ (DAIFRON) | (b) | ○(b) | A | A | 2200 | ○ | A |
| 61 | " | " | " | " | ○ (DAIFRON) | (c) | ○(c) | A | A | 2140 | ○ | A |
| 62 | " | " | " | " | ○ (DAIFRON) | (d) | ○(d) | A | A | 2160 | ○ | A |
| 63 | " | " | " | " | ○ (DAIFRON) | (e) | ○(e) | A | A | 2050 | ○ | A |
| 64 | " | " | " | " | ○ (DAIFRON) | (a) | ○(b) | A | A | 2080 | ○ | A |
| 65 | " | " | " | " | ○ (DAIFRON) | (b) | ○(a) | A | A | 2110 | ○ | A |
| 66 | " | " | " | 0.5 | ○ (DAIFRON) | (a) | ○(a) | A | A | 2020 | ○ | A |
| 67 | CoCr | Carbon | V | 2.4 | ○ (DAIFRON) | (a) | ○(a) | A | A | 2170 | A | A |
| 68 | " | " | " | 3.2 | ○ (DAIFRON) | " | " | A | A | 2200 | A | A |
| 69 | " | " | " | 5.1 | ○ (DAIFRON) | " | " | A | A | 2110 | A | A |
| 70 | " | " | " | 9.3 | ○ (DAIFRON) | " | " | A | A | 2020 | A | A |
| 71 | " | " | " | 4.8 | ○ (DAIFRON) | " | " | A | A | 2090 | A | A |
| 72 | " | " | Cr | " | ○ (DAIFRON) | " | " | A | A | 2010 | A | A |
| 73 | " | " | Mn | " | ○ (DAIFRON) | " | " | A | A | 2040 | A | A |
| 74 | " | " | Mo | " | ○ (DAIFRON) | " | " | A | A | 2070 | A | A |
| 75 | " | " | Nb | " | ○ (DAIFRON) | " | " | A | A | 2100 | A | A |
| 76 | " | " | Ta | " | ○ (DAIFRON) | " | " | A | A | 2130 | A | A |
| 77 | " | " | W | " | ○ (DAIFRON) | " | " | A | A | 2080 | A | A |
| 78 | CoNi | " | V | " | ○ (DAIFRON) | " | " | A | A | 2100 | A | A |
| 79 | CoCr | " | " | " | ○ (DAIFRON) | (f) | ○(f) | A | A | 1700 | A | A |
| 80 | " | " | " | " | ○ (DAIFRON) | (h) | ○(h) | A | A | 1850 | A | A |

As described above, in accordance with the magnetic recording medium of above-described invention, a lubricating layer can be uniformly coated onto a protective layer; the friction coefficient with a magnetic head can be drastically reduced; no attachments adhere to be apparent to one skilled in the art that various changes and modifications can be made therein without departing from the spirit and scope thereof.

What is claimed is:

1. A method for preparing a magnetic recording medium which comprises the steps:

(a) providing on a non-magnetic support, a thin magnetic metal film,
(b) providing on the thin magnetic film, a protective layer comprised substantially of carbon,
(c) washing the surface of the protective layer at least once, each washing performed with one substance selected from the group consisting of an alkali detergent, a neutral detergent and an organic solvent, and
(d) providing on the surface of the protective layer, a lubricating layer containing at least one organic lubricating agent.

2. The method according to claim 1, wherein said protective layer further comprises at least one metal selected from the group consisting of Cr, Mn, Mo, Nb, Ta, Ti, V and W as an additive, and said at lease one metal is present in said protective layer in an amount of not greater than 10% by weight of the total amount of carbon in said protective layer.

3. The method according to claim 1, wherein said organic lubricating agent comprises an organic fluorine lubricating agent.

4. The method according to claim 3, wherein an organic solvent is used for washing the protective layer, which comprises a chlorofluorocarbon solvent.

5. The method according to claim 1, wherein said organic lubricating agent comprises a phosphate compound.

6. The method according to claim 1, wherein said organic lubricating agent comprises an organic compound having a mercapto group.

7. A magnetic disk comprising a magnetic recording medium, wherein said magnetic recording medium is prepared according to the method of claim 1.

8. The magnetic disk as claimed in claim 7, wherein said protective layer further comprises at least one metal selected from the group consisting of Cr, Mn, Mo, Nb, Ta, Ti, V and W as an additive.

9. The magnetic disk as claimed inn claim 7, wherein said organic lubricating agent comprises a fluorine lubricating agent.

10. The magnetic disk as claimed in claim 9, wherein said protective layer is washed with an organic solvent which comprises a chlorofluorocarbon solvent.

11. The magnetic disk as claimed in claim 9 wherein said organic lubricating agent comprises a phosphate compound.

12. The magnetic disk as claimed in claim 9, wherein said organic lubricating agent comprises an organic compound having a mercapto group.

13. The method according to claim 1, wherein the surface of said protective layer is washed with a neutral detergent which comprises sodium alkyl sulfonate.

14. The method according to claim 1, wherein the surface of said protective layer is washed with an organic solvent selected from the group consisting of benzene, chlorobenzene, acetone, ether and chlorofluorocarbon.

15. The method according to claim 3, wherein said organic fluorine-lubricating agent is selected from the group consisting of compounds having a perfluoroalkyl group or a perfluoroalkenyl group, perfluoroalkylene oxide polymers and derivatives thereof, and polymers and copolymers of ethylene containing at least one fluorine substituent.

16. The method according to claim 1, wherein the surface of said protective layer is washed with an alkali detergent comprising an amphoteric surface active agent.

17. The method according to claim 1, wherein the surface of said protective layer is first washed with a neutral detergent and then with an organic solvent.

18. The method according to claim 1, wherein said carbon is in the form of amorphous carbon or graphite.

19. The magnetic disk as claimed in claim 7, wherein said magnetic recording medium is encased within a liner and said liner is impregnated with an organic lubricating agent.

20. The method of claim 1, wherein the surface of said protection layer is washed with an organic solvent selected from the group consisting of trichloromonofluoromethane, 1,1,2,2-tetrachloro-1,2-difluoroethane and 1,1,2-trichloro-1,2,2-trifluorethane.

* * * * *